United States Patent [19]

Marich

[11] Patent Number: 5,720,167
[45] Date of Patent: Feb. 24, 1998

[54] ROTATING PUMP SEAL

[75] Inventor: Randall Milton Marich, Howell, Mich.

[73] Assignee: General Motors Corporation, Detroit, Mich.

[21] Appl. No.: 720,541

[22] Filed: Sep. 30, 1996

[51] Int. Cl.[6] .................................................... F16D 33/00
[52] U.S. Cl. ............................... 60/339; 60/358; 60/330
[58] Field of Search ............................ 60/330, 339, 358, 60/362, 364, 365, 366, 367

[56] References Cited

U.S. PATENT DOCUMENTS

| | | | |
|---|---|---|---|
| 3,151,457 | 10/1964 | Jandasek | 60/358 |
| 3,554,057 | 1/1971 | Michnay et al. | 74/732 |
| 4,094,512 | 6/1978 | Back | 277/27 |
| 4,123,068 | 10/1978 | Van Gorder | 277/27 |
| 4,441,349 | 4/1984 | Symons | 72/83 |
| 4,850,832 | 7/1989 | Murota | 418/170 |
| 4,934,216 | 6/1990 | Sandel et al. | 475/59 |
| 5,152,190 | 10/1992 | Jurgens et al. | 74/606 R |
| 5,157,984 | 10/1992 | Hosono et al. | 74/467 |
| 5,352,100 | 10/1994 | Bauknecht et al. | 60/339 |

*Primary Examiner*—F. Daniel Lopez
*Attorney, Agent, or Firm*—Jeffrey A. Sedlar

[57] ABSTRACT

A rotating pump seal is interposed between a transmission's pump and pump body bushing. The seal includes a predetermined flow area allowing a sufficient amount of fluid flow to lubricate the bushing while restricting excessive flow.

5 Claims, 3 Drawing Sheets

ROTATING PUMP SEAL

TECHNICAL FIELD

This invention relates to the field of transmissions. More specifically, it relates to the sealing of transmissions.

BACKGROUND OF THE INVENTION

Vehicle transmissions conventionally have a pump at the from of the transmission assembly that includes a rotor driven by an engaging torque converter output hub. The output hub and rotor are engaged through an interpositioned shaft and move in concerted rotation. A pump body bushing, positioned in the pump, journals the output hub. One side of the bushing is exposed to high pressure operating fluid from the pump. The bushing serves the additional function of sealing the high pressure fluid generated by the pump in the transmission case.

Generally, the bushing is comprised of metal. This conventional type of bushing, used in an automatic transmission, does not provide a completely leakproof seal. Therefore, the bushing serves as a means of reducing leakage between one part of the transmission and another.

An annular exterior lip seal is conventionally mounted on the pump cover and bears against the hub to prevent the operating fluid that travels past the bushing from traveling along the hub and escaping the transmission housing. Passages are provided to permit return of the leakage fluid to the transmission sump.

As wear occurs between the hub and the bushing the amount of leakage as expected, increases. Additionally, due to the difference in coefficients of expansion between the bushing and the aluminum pump housing, gaps and leakage typically increase as transmission operating temperatures rise. With the wear and temperature related increases, leakage past the bushing may become unpreferably excessive at normal transmission operating temperatures as an increasing amount of fluid is diverted from the transmission's operating components.

With bushing wear and increased temperature losses, the flow of fluid past the bushing increases to the point where the pump's ability to maintain operating pressures is dished. Therefore, oversized pumps are required to provide extra pumping capacity, compensating for expected increases in fluid flow past the bushing. Leakage fluid can also potentially pass by the lip seal and escape the transmission as a result of increased pressures at the lip seal due to bushing wear. Additionally, since the leakage fluid passes directly back to the sump, increased leakage results in reduced fluid flow through the oil cooler and higher transmission operating temperatures.

It is desired to minimize the sensitivity of the transmission to bushing wear. Maintaining low leakage levels will maintain pump pressure, making it unnecessary to oversize the pump to compensate for such leakage. Controlling leakage will also direct more of the pumped fluid through the cooler resulting in lower transmission operating temperatures.

SUMMARY OF THE INVENTION

Due to the extent of leakage past the conventional bushing, a low pressure operating fluid condition exists opposite the high pressure side of the bushing. It has been determined that the amount of leakage can be expected to generate a low pressure operating fluid condition downstream from the bushing in the range of 20 to 40 pounds per square inch.

To alleviate excessive flow of fluid past the bushing, the transmission according to this invention includes an annular seal axially positioned between the pump rotor and the bushing. The seal rotates in concert with the hub thereby preventing wear therebetween.

A certain amount of this fluid is required to travel between the hub and the bushing to provide lubrication therebetween. However, the amount of leakage is typically much greater than that required for lubrication purposes. Therefore, the present invention includes a seal designed to communicate a controlled amount of operating fluid along the hub to the bushing for lubrication thereof, while maintaining substantially full pump pressure.

The transmission includes a cylindrical torque converter output hub projecting from a torque converter shell and operably rotating about an input axis. A pump rotor is engaged by the output hub at an end of the hub opposite the shell, for concerted rotation therewith. A bushing is disposed in a stationary transmission pump cover of a pump housing between the shell and the rotor and rotatably supports the hub in a journaled relationship.

It has been found that the pump cover, made of aluminum, is more wear resistant in this application than the steel converter hub. To avoid hub wear, the rotating seal positively engages the rotating elements for concerted rotation with the rotor, and therefore, with the hub. The rotating seal bears against the stationary pump cover, with relative rotation occurring therebetween.

The seal also preferably provides a predetermined flow area to communicate fluid along the hub to the bushing for lubrication thereof, while maintaining pump pressure on the rotor side of the seal. The rotating seal provides a means for controlling the amount of leakage past the bushing, minimizing or eliminating the leakage of fluid past the exterior lip seal, directing more fluid through the cooler and allowing the use of optimally sized pumps in transmissions. Because there is no relative rotation between the seal and the hub, the seal will not cause the hub to wear and no wear related change in the predetermined flow area between the seal and the hub will occur.

DETAILED DESCRIPTION OF THE PRESENTLY PREFERRED EMBODIMENT

Figure 1:
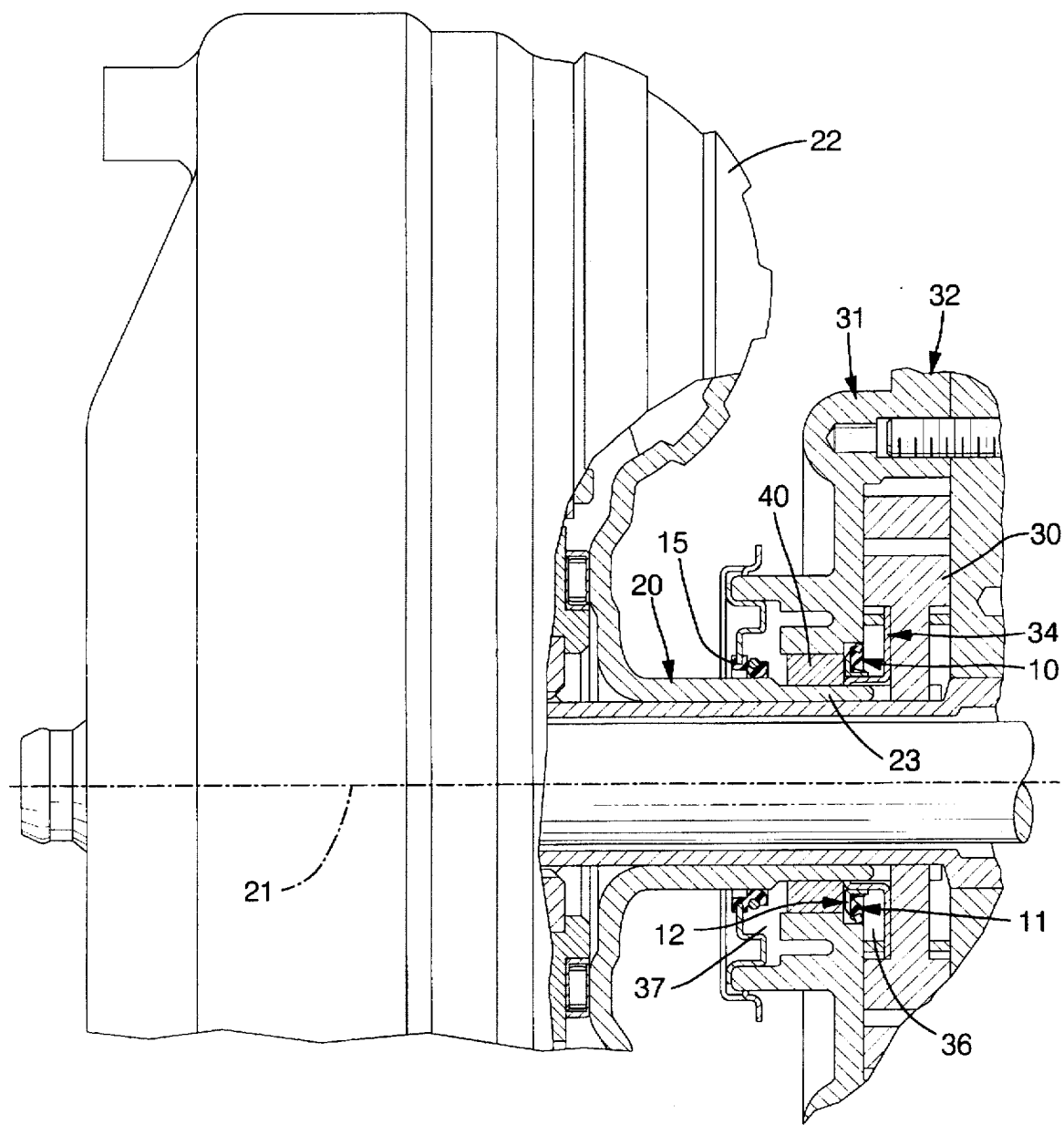
FIG. 1 is a partial cross sectional view of a transmission.

Referring to FIG. 1, a motor vehicle transmission includes it a torque converter output hub 20 projecting from a torque converter shell 22 which operably rotate about an input axis 21. A vane pump rotor 30 disposed in a pump housing 32 is engaged by the output hub 20 for rotation therewith. Rotor 30 is positioned at end 23 of the hub 20 opposite the shell 22 and includes a rotor guide 34. A pump body bushing 40 is disposed in a transmission pump cover 31 of the pump housing 32 and rotatably supports the hub 20 between the shell 22 and the rotor 30. An exterior lip seal 15 on the pump cover 31 bears against the hub 20 to prevent operating fluid from traveling past the bushing 40 and escaping the transmission.

The transmission has, according to this invention, a rotating seal 10 axially located in the pump housing 32 between the rotor 30 and the bushing 40. Seal 10 is more clearly illustrated in FIG. 2. The rotating seal includes a seal support 12 and a seal body 11 bonded thereto.

The seal support 12 is formed of steel and is located radially between the pump cover 31 and the pump rotor guide 34. The seal support 12 has a first annular flange 16 adapted to positively engage the pump rotor guide 34. The seal support 12 has a second annular flange 17 with an edge 18 forming an outside diameter, sized to be received by a cylindrical cavity 33 in the pump cover 31.

Seal 10 includes an inside diameter formed by surface 51 of the first flange 16. The inside diameter engages the rotor guide 34. Three axial grooves, represented by groove 19, in the periphery of inside diameter surface 51 define the predetermined flow area for fluid flow to bushing 40. Each groove has an area of approximately 0.002 square inches to provide the desired flow area in the present example, although flow area is determined for each application.

As an alternative to three axial grooves in the seal support 12, an outside diameter surface 54 of the rotor guide 34, can be formed to establish a flow area (not illustrated), between the pump high pressure cavity 36 and the hub 20. The alternative flow area is approximately 0.006 square inches, although it is sized according to each specific application.

A seal body 11 is bonded to the second annular flange 17 and has an outer lip 52 adapted to bear against an inside diameter surface 55 of the transmission pump cover 31, in the cylindrical cavity 33. The seal body 11 is formed of a suitable conventional flexible elastomeric seal material such as VITON. Outer lip 52 includes leading edge 53 which is adapted to contact the pump cover 31. Outer lip 52 is formed of a stiff low friction wear resistant material such as RULON. The outer lip 52 is partially embedded in the softer elastomeric material of body 11. When the rotating seal 10 is installed, the leading edge 53 contacts the transmission pump cover 31 on the inside diameter surface 55, in the cylindrical cavity 33. Fluid pressure in cavity 36 helps to maintain contact between leading edge 53 and inside diameter surface 55.

The invention operates in the following manner. The converter shell 22, output hub 20, and pump rotor 30 rotate as a unit, thereby developing a pump pressure within the pump housing 32. The rotor guide 34 and seal 10 rotate with the pump rotor 30. The outer seal lip 52 rotates against the inside diameter surface 55 in the cylindrical cavity 33 of the pump cover 31. Pressure in the high pressure cavity 36 in pump housing 32 tends to force the lip 52 to bear against the inside diameter surface 55.

The pressurized operating fluid is forced through the grooves, represented by groove 19, or, in the alternative embodiment, through the clearance in the rotor guide 34. In either embodiment the flow therethrough is minimal and does not result in a significant loss of pump pressure. Fluid passing along the hub 20 past the seal 10 reaches the bushing 40 for the lubrication thereof. Fluid passing beyond the bushing 40, into low pressure cavity 37, is contained by the exterior lip seal 15 and returned to a transmission sump (not shown) through a channel (not shown) in the pump housing 32.

The seal 10 rotates with the hub 20 eliminating wear therebetween, making it possible to consistently maintain the predetermined flow area past the seal 10. It is readily apparent that bushing wear and a resultant increased radial clearance between the hub and the bushing will not increase the amount of operating fluid moving past the bushing since the fluid flow is now controlled by the rotating seal 10.

This invention places rotation relative to the seal 10 between the pump cover 31 and the seal 10. The pump cover 31, which is made of aluminum, has proven to be more wear resistant in this application than the hub 20, which is made of steel. The use of a wear resistant leading edge 53 in the outer seal body 11 has diminished the potential for wear of the seal 10. The resultant seal 10 restricts fluid flow in the desired fashion over an extended period of time, thereby allowing the use of optimally sized pumps in transmissions.

Figure 3:
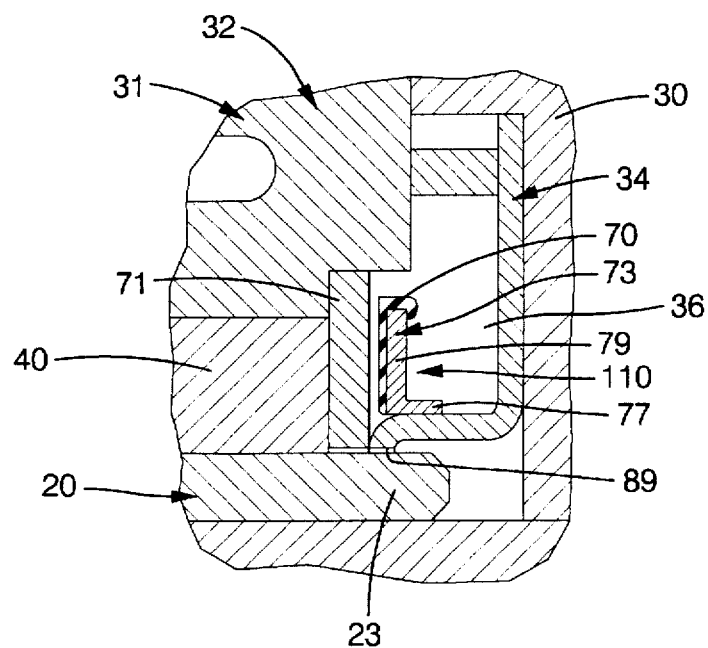
FIG. 3 is a detail cross sectional view of another embodiment of a rotary pump seal.

FIG. 3 illustrates another embodiment of the rotating pump seal. A thrust washer 71 is positioned between the pump cover 31 and the torque converter output hub 20 and abuts the pump body bushing 40. The thrust washer 71 is stationary in the sense that it does not rotate relative to pump housing 31.

Mounted on the rotating pump rotor guide 34 is the rotating pump seal 110. Seal 110 is comprised of seal support 73 and seal body 70. Seal support 73 includes annular flange 77 for mounting over the annular pump rotor guide 34 and annular flange 79 for supporting seal body 70. Annular flange 79 positions seal body 70 adjacent to thrust washer 71.

During operation of the transmission, high pressure fluid in cavity 36 forces seal body 70 against thrust washer 71 to seal the high pressure fluid in cavity 36 and inhibit leakage. Relative rotation occurs between the rotating seal body 70 and the stationary thrust washer 71.

Pump rotor guide 34 includes groove 89 which defines a predetermined flow area for fluid to flow from high pressure cavity 36 along hub 20 to bushing 40 for lubrication thereof. This controlled leakage is significantly reduced in volume as compared to that which would occur if the high pressure fluid in cavity 36 were allowed to act directly upon bushing 40.

Figure 2:
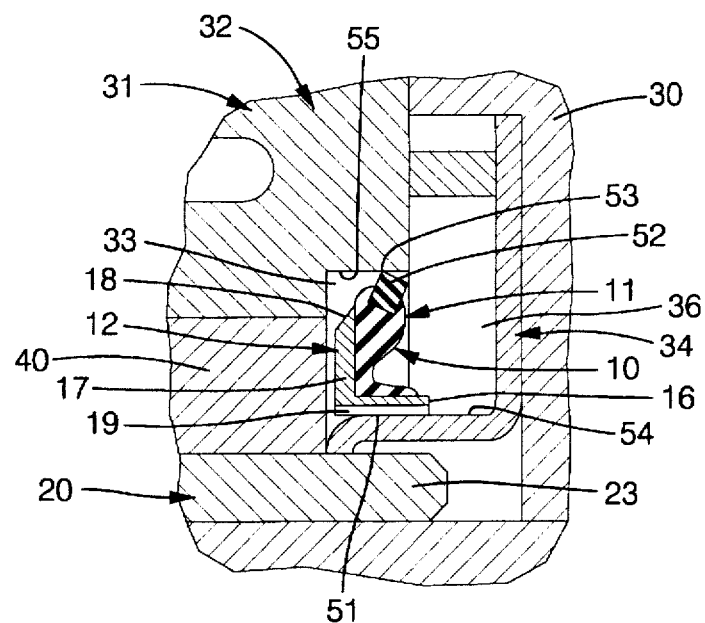
FIG. 2 is a detail cross sectional view of the rotary pump seal area of FIG. 1.
Figure 4:
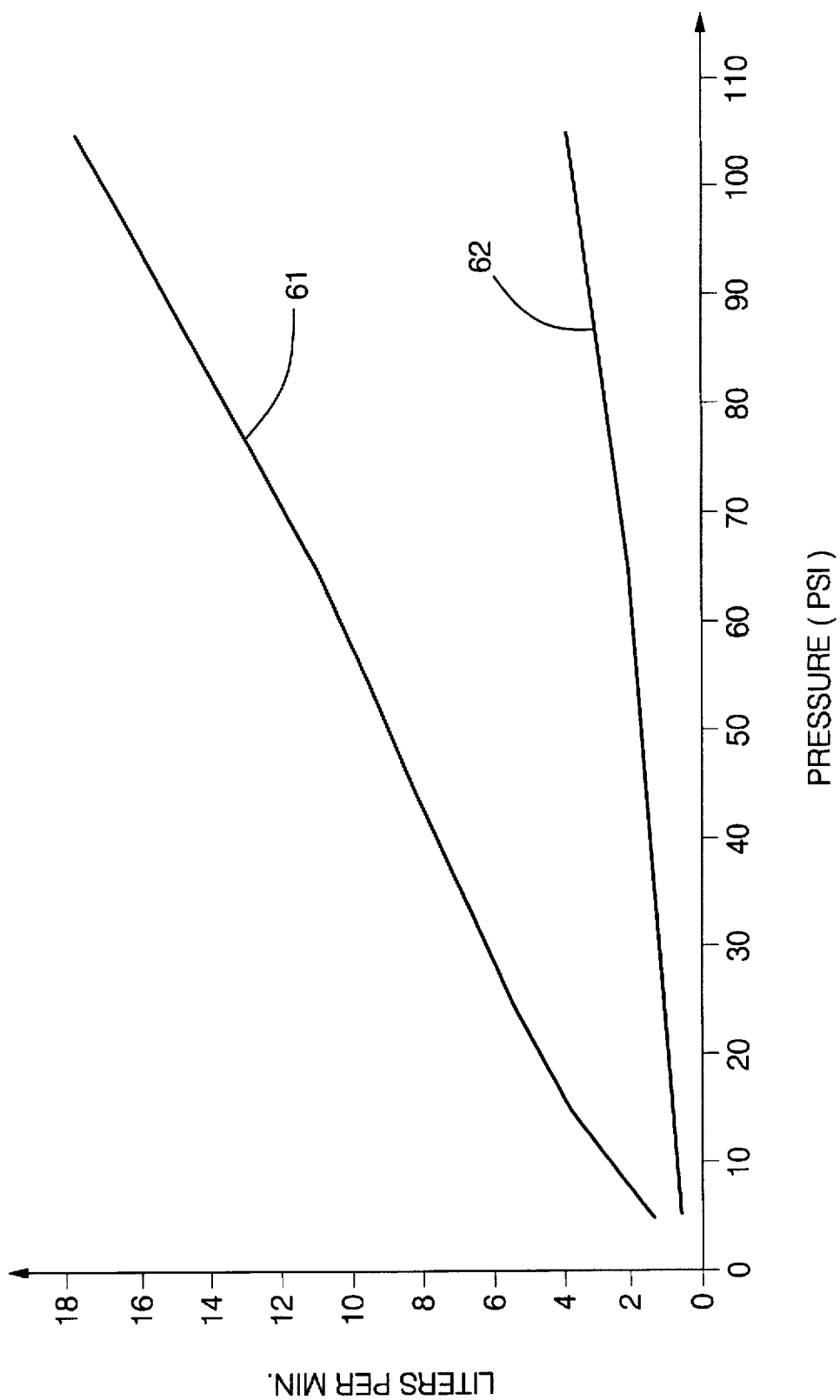
FIG. 4 is a graph of leakage flow in liters per minute versus pressure in pounds per square inch.

FIG. 4 graphs the performance of a conventional bushing arrangement by curve 61 and of a bushing and seal arrangement according to the seal embodiment of FIG. 1 and 2 by curve 62. The graph demonstrates flow versus pressure performance for two pump tests. The tests were conducted on a pump test stand machine. Curve 61 represents a conventional test part with 20,000 miles of wear. Curve 62 represents a test part according to the present invention with 20,000 miles of wear. A comparison at 65 pounds per square inch shows that curve 61 is at approximately 11.5 liters per minute leakage and curve 62 is at approximately 1.7 liters per minute leakage.

I claim:

1. A transmission comprising:
   a pump having a pump housing;
   a rotatable pump rotor in the pump, the rotatable pump rotor including a rotor guide having an opening defining a predetermined flow area;
   a torque converter having a hub engaging the rotatable pump rotor;
   a bushing carried by the pump housing and journaling the hub; and
   a seal positioned between the rotatable pump rotor and the bushing.

2. A motor vehicle transmission including a pump having a stationary pump cover comprising:
   a cylindrical torque converter including a shell and an output hub, operably rotating about an input axis;
   a pump rotor engaged by the output hub for unitary rotation therewith;

a bushing disposed in the pump cover rotatably supporting the hub between the shell and the pump rotor;

a rotating seal axially located between the bushing and the pump rotor, rotating with the rotor, sealingly bearing against the pump cover maintaining pump pressure on a rotor side of the seal and defining a predetermined flow area communicating operating fluid along the hub to the bushing for lubrication thereof.

3. A motor vehicle transmission according to claim 2, further comprising:

a rigid seal support rotating with the pump rotor and a seal body attached to the rigid seal support and having an outer lip bearing against transmission pump cover.

4. A motor vehicle transmission according to claim 3, wherein an inside diameter of the seal support includes an opening defining the predetermined flow area.

5. A motor vehicle transmission according to claim 4, wherein the seal body includes a flexible elastomeric base and the outer lip includes a stiff low friction wear resistant leading edge contacting the transmission pump cover.

* * * * *